US008695030B2

(12) United States Patent
Runne (10) Patent No.: US 8,695,030 B2
(45) Date of Patent: Apr. 8, 2014

(54) INSTANT MESSAGING WITH A MEDIA DEVICE

(75) Inventor: Michael Runne, Euless, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 488 days.

(21) Appl. No.: 11/610,874

(22) Filed: Dec. 14, 2006

(65) Prior Publication Data

US 2008/0148328 A1    Jun. 19, 2008

(51) Int. Cl.
*H04N 7/10* (2006.01)
*H04N 7/025* (2006.01)

(52) U.S. Cl.
USPC ............ 725/32; 725/109; 725/110; 725/135; 709/204

(58) Field of Classification Search
USPC ........................................... 725/109, 32, 135
See application file for complete search history.

(56) References Cited

U.S. PATENT DOCUMENTS

| | | | |
|---|---|---|---|
| 5,727,215 A * | 3/1998 | Rynaski et al. | 717/173 |
| 5,977,962 A * | 11/1999 | Chapman et al. | 725/37 |
| 7,272,662 B2 * | 9/2007 | Chesnais et al. | 709/246 |
| 2002/0062406 A1 * | 5/2002 | Chang et al. | 710/1 |
| 2002/0104097 A1 * | 8/2002 | Jerding et al. | 725/115 |
| 2002/0165000 A1 * | 11/2002 | Fok | 455/466 |
| 2003/0040932 A1 * | 2/2003 | Sato | 705/1 |
| 2003/0049595 A1 * | 3/2003 | Stuppy et al. | 434/350 |
| 2003/0228866 A1 * | 12/2003 | Pezeshki | 455/422.1 |
| 2004/0068567 A1 * | 4/2004 | Moran et al. | 709/227 |
| 2004/0068574 A1 * | 4/2004 | Costa Requena et al. | 709/230 |
| 2004/0203766 A1 * | 10/2004 | Jenniges et al. | 455/435.1 |
| 2004/0231003 A1 * | 11/2004 | Cooper et al. | 725/135 |
| 2005/0086376 A1 * | 4/2005 | Park et al. | 709/245 |
| 2005/0160140 A1 * | 7/2005 | Kadyk et al. | 709/203 |
| 2006/0259592 A1 * | 11/2006 | Angeline | 709/219 |
| 2007/0174886 A1 * | 7/2007 | Scheuer et al. | 725/110 |

* cited by examiner

*Primary Examiner* — Robert Hance (57) ABSTRACT

A content processing device is provided. Media content is selectively received by the content processing device for display on a media playback device. A software application is included on the content processing device and is configured to perform at least one of (a) receiving message content from a remote computer and providing the message content for display on the media playback device, and (b) receiving, from the media playback device, input for a message and sending the input to the remote computer.

29 Claims, 5 Drawing Sheets

INSTANT MESSAGING WITH A MEDIA DEVICE

BACKGROUND INFORMATION

Messaging services such as instant messaging services allow people to communicate with one another at a wide variety of locations using computer networks, Client devices for using messaging service generally include conventional computing devices such as desktop, laptop, handheld computers etc. as well as cellular telephones. However, if a person wishes to send a message, or is an intended recipient of a message, and the person is not using an appropriate client device, it is not possible for the person to send or receive a message. In some cases, a person may wish to send a message, or may be an intended recipient of a message, and may be using a computing device connected to a computer network, but nonetheless is unable to send or receive a message.

DETAILED DESCRIPTION OF PREFERRED EMBODIMENTS

Figure 1:
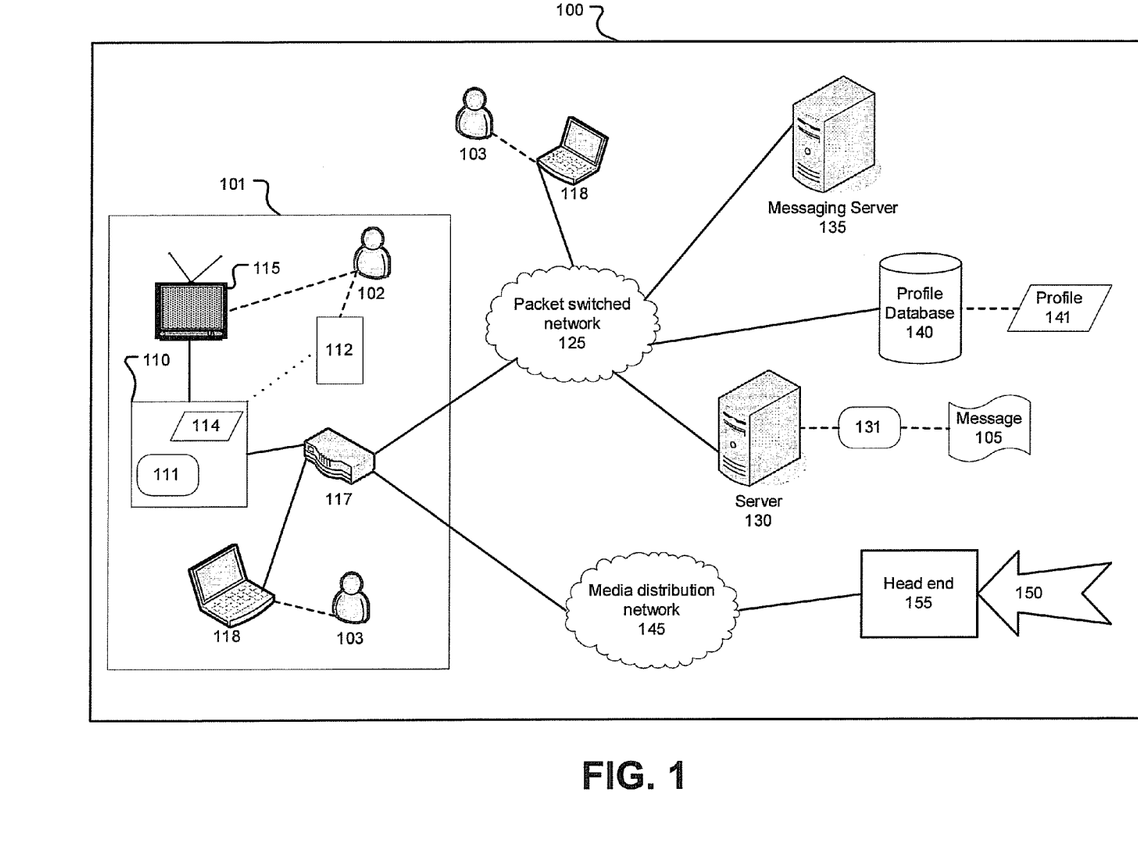
FIG. 1 illustrates an exemplary system for sending and receiving messages or message content through a content processing device that is also used for delivering media content to a customer premise.

FIG. 1 illustrates an exemplary system 100 for sending and receiving messages 105 or at least content of messages 105 through a content processing device 110 that is also used for delivering media content 150 to a customer premise 101. A user 102 may access the media content 150 and also message 105 content through a media playback device 115. Customer premises 101 may be a home, business, or any other location including a content processing device 110, and may include multiple content processing devices 110, although only one device 110 is illustrated in FIG. 1.

Content processing device 110 generally includes a processor, memory, and possibly other computer-readable media, and further includes a messaging application 111 to send and receive messages over a packet switched network 125. Content processing device 110 generally is a specialized device, e.g., a set top box (STB) or the like, for receiving media content 150 from head end 155 via network 145, and for providing media content 150 to media player 115. Media content 150 may be provided as an analog or as a digital signal, e.g., an analog or digital video signal.

As noted above, content processing device 110 generally includes a processor and a memory, and may be provided with a proprietary or specialized operating system. For example, content processing device 110 may be an STB provided with a real time operating system (RTOS) such as is known. However, it is to be understood that content processing device 110 may be a computing device such as one of those enumerated below, so long as the computing device is capable of receiving media content 150 from network 145, and is capable of storing and executing the instructions included in message 105. Content processing device 110 generally also includes, e.g., stored in a read only memory (ROM), a unique or substantially unique identifier 114 that identifies the content processing device 110.

Further, content processing device 110 generally includes messaging application 111. Messaging application 111 may be in selective communication with a messaging proxy application 131 included on an application server 130. Messaging application 111 generally includes program instructions for, among other things, receiving messages 105 and/or message 105 content via a packet switched network 125 and also usually via application server 130 and/or a messaging server 135, providing such messages for display on media player 115, accepting input from media player 115 in response to messages, etc. Messaging application 111 may support a variety of protocols and transfer mechanisms, e.g., those discussed below with reference to messaging server 135. However, messaging application may be configured simply to send message 105 input to, and receive message 105 content from, messaging proxy application 131 according t a proprietary format, an extensible Markup Language (XML) schema, etc. Message 105 generally includes digital data that may be provided in a display, e.g., of playback device 115. Message 105 may be a text message or the like, but may also include multimedia elements such as images, video, audio, etc.

Media player 115 receives media content 150 from content processing device 110, and plays such media content 150 so that it can be perceived by a user. Media player 115 may be a television receiver, such as is known, including a television or a high definition television (HDTV). Media player 115 may also be used to provide a user interface to certain functions and menus provided by content processing device 110. For example, a television may be used to display a graphical user interface to access various menus within an STB.

A user 102 may utilize a control 112 to operate content processing device 110. Control 112 is generally a remote control that can selectively communicate with content processing device 110 through known wireless communications including infrared (IR) and radio frequency (RF) communications. Control 112 may include numeric keys, arrow buttons, keys for specific functions, etc., and may also include alphanumeric keys. Control 1112 may also be a wired or wireless keyboard as is known. A user 102 may utilize control 112 to select media content channels, access various menus and optional settings, make selections and requests, and input data, such as input for a text message 105. Control 112 generally facilitates access to various to functions and menus provided by or through content processing device 110, and may also be used to control other devices, including media player 115.

Content processing device 110 selectively communicates with various devices via a broadband home router (BHR) 117, including a client computer 118, which may be accessed by a user 103 for sending and receiving messages 105. BHR 117 may be one or more devices that are generally known for routing network traffic. BHR 117 facilitates data transfer over one or more networks, including a packet switched network 125 and a media distribution network 155.

BHR 117 is known for distributing audio, video, and data to devices within customer premises 101 such as content processing device 110. For example, BHR 117 may be a broadband home router or wireless broadband home router from Actiontec Electronics, Inc. of Sunnyvale, Calif. BHR 117 may also provide a wired or wireless local area network (LAN), thereby providing selective communications between various devices within customer premises 101. For example, client computer 118 may utilize BHR 117 to communicate with content processing device 110. Client computer 118 may be a computer workstation, a desktop, notebook, laptop, handheld computer, a personal digital assistant (PDA), a cellular phone, a smartphone, or some other computing device utilizing hardware and software to communicate with content processing device 110.

Content processing device 110 may use BHR 117 to send information to, and receive information from, a packet switched network 125. BHR 117 may access packet switched network 125. An interactive program guide (IPG) server 130 and a messaging server 135 may also selectively communicate via network 125, but may also selectively communicate with BHR 117 via a media distribution network 145. Further, client computer 118 may communicate through packet switched network 125, thereby enabling a user 103 to send and receive messages 105 anywhere that client computer 118 may access the network 125.

Media distribution network 145 is a network such as is known for providing media content 150. For example, network 145 may include hardware and software for providing a video signal via a coaxial cable and/or a fiber optic cable. As is known, media content 150 is generally provided to a media distribution network 145 from a head end 155.

Packet switched network 125 is generally an internet protocol (IP) network that utilizes known protocols found generally within the internet protocol suite. For example, network 125 uses protocols such as user datagram protocol (UDP), transmission control protocol (TCP), hypertext transfer protocol (HTTP), etc. Further, network 125 may include a variety of networks such as a wide area network (WAN), e.g., the internet, a local area network (LAN), etc. As is known, packet switched network 125 may be used to transport a variety of data, including multimedia data, such as audio and video. Accordingly, it is to be understood that scenarios are possible in which networks 125 and 145 are in fact combined into a single network, or in which media distribution network 145 is simply omitted, whereby packet switched network 125 is used to provide media content 150 to content processing device 110.

Application server 130 includes a messaging proxy application 131, and selectively communicates with content processing device 110, e.g., through network 125. Messaging proxy application 131 supports the operation of messaging application 111, including sending messages to and from messaging application 111. Application server 130 and messaging proxy application 131 also selectively communicate with a messaging server 135, discussed further below.

Messaging proxy application 131 is useful when limited resources, e.g., limited memory and/or persistent storage, in content processing device 110 make hosting at complete messaging client and content processing device 110 impractical or impossible. Accordingly, messaging application 111 may be stored persistently in content processing device 110 or may be downloaded to content processing device 110 from application server 130 when requested by a user 102.

Further, even if messaging application 111 is stored persistently in content processing device 110, the application 111 may access messaging proxy application 131 for performing certain operations. For example, it may not be practical to store permanently in content processing device 110 a complete address book or complete set of information concerning potential message 105 recipients. Therefore, such information may be obtained from messaging proxy application 131 and temporarily stored in content processing device 110 when a user 102 seeks a list of potential message 105 recipients. Other operations such as signaling messaging server 135 to indicate a network presence, sending messages 105, receiving messages 105, etc. may also be performed by messaging proxy application 131 on behalf of messaging application 111. Thus, in one embodiment, messaging application 111 primarily serves to forward text strings and the like to messaging proxy application 131, along with limited header information indicating a recipient for a message 105.

In addition to messaging application 131, application server 130 may host a variety of other applications and/or services that are provided to content processing device 110. For example, application server 130 further generally provides information related to available media content 150, such as an interactive program guide (IPG) or the like, to content processing device 110. Media content information may include dates and times of television programs and movies, descriptions of particular content, channel information, parental guidelines, etc. Application server 130 may also provide an interactive program guide to content processing device 110 for display on media player 115. As is known, an interactive program guide allows users to obtain information and to select media content 150, generally by navigating and making selections using control 112. Application server 130 generally includes a processor and a memory, as well as a computer readable medium such as a disk for storing data, e.g., interactive program guide data, to be provided to content processing device 110. Although one application server 130 is shown in FIG. 1, it is to be understood that application server 130 may include multiple server devices hosting one or more software applications in selective communication with content processing device 110.

Messaging server 135 is in selective communication with application server 130 and messaging application 131 as mentioned above, and/or possibly also content processing device 110 and messaging application 111, generally via network 125. Messaging server 135 is generally configured to facilitate transfers of messages 105 between various computing devices including content processing device 110, client computer 118, and profile database 140. Messaging server 135 may be implemented in software running on application server 130, content processing device 110, client computer 118, or any other computing device capable of communicating via network 125. However, messaging server 135 may also be a standalone computing device that includes a processor and a memory, as well as a computer readable medium for storing data. Further, messaging server 135 may include other software, such as web server software as is known for providing web pages and the like.

Messaging server 135 may utilize various hardware and software elements to facilitate transfers of messages 105. In particular, messaging server 135 may include an instant messaging server such as is known, and application 131 may include an instant messaging client such as is known. Messaging server 135 may utilize message transfer systems and protocols for message 105 including protocols for instant messaging such as Session Initiation Protocol for Instant Messaging and Presence Leveraging Extensions (SIMPLE), Extensible Messaging and Presence Protocol (XMPP), Short Message Service (SMS), or the like. Accordingly, messaging server 135 generally supports real-time or near real-time messaging. Message 105 may also utilize various encryption technologies including public key infrastructure (PKI), digital signatures, digital certificates, secure shell (SSH), secure sockets layer (SSL), and transport layer security (TLS), to name but a few.

Further, messaging server 135 may utilize other message transfer mechanisms for message 105 as discussed further in co-pending application entitled MESSAGING WITH INSTRUCTIONS FOR MEDIA PLAYBACK, filed the same day as the present application, and fully incorporated herein by reference in its entirety. Uses for messaging server 135 are also discussed in co-pending application entitled PARENTAL CONTROLS IN A MEDIA NETWORK, filed the same day as the present application, and fully incorporated herein by reference in its entirety.

A profile database 140 stores profiles 141. A profile 141 may be associated with one or more various entities, such as a user 102, a content processing device 110, and/or a customer premise 101. Accordingly, profile 141 generally is associated in database 140 with at least one of a user 102 identifier, an identifier 114 for a content processing device, an identifier for a customer premise 101, etc. Further, profile 141 generally includes information identifying subscribed-for services via network 145, such as subscribed-for channels of media content 150. A profile 141 may also include personalization settings, media access restrictions, records of accessed media content 150, etc. Profile database 140 is generally in communication with content processing device 110 and messaging server 135 via network 125, but may be included within messaging server 135.

Computing devices such as content processing device 110, client computer 118, application server 130, messaging server 135, and similar devices may employ any of a number of known computer operating systems. For example, such devices may use any known versions and/or varieties of the Microsoft Windows operating system; the Unix operating system (e.g., the Solaris operating system distributed by Sun Microsystems of Menlo Park, Calif.); the AIX UNIX operating system distributed by International Business Machines of Armonk, N.Y.; and the Linux operating system. Computing devices may include any one of a number of computing devices that are known, including, without limitation, a computer workstation, a desktop, notebook, laptop, handheld computer, or some other computing device.

Content processing device 110 generally also includes application 111. Application 111 includes computer-executable instructions and may provide various services such as parental controls, remote communications, instant messaging, data collection, etc. Such software may be commercially available or proprietary and may include multiple software packages or modules. Content processing device 110 may also include application 111 for providing a graphical user interface (GUI) to a user. Such a GUI generally provides the user with the ability to interact with various other software modules, packages, and mechanisms within content processing device 110, and generally included in application 111. The GUI may allow a user to modify various internal settings within content processing device 110, and may provide one method for a user to interact with messaging proxy application 131. A user may access the GUI using control 112 and view the GUI using media player 115. For example, application 111 may include an interface for inputting and sending messages 105 that a user can access using control 112 and view using media player 115. A user 102 may supply input, such as is mentioned above, for message 105 using the GUT and control 112. The input from user 102 may be a text message, or may be derived from a series of menu selections. Preferably, content processing device 110 accepts a user's input using control 112 and a GUI that is displayed using media player 115. Content processing device 110 may then provide the user's input into message 105.

Computing devices, such as content processing device 110, generally include instructions executable by one or more computing devices such as those listed above. Computer-executable instructions may be compiled or interpreted from computer programs created using a variety of programming languages and/or technologies known to those skilled in the art, including, without limitation, and either alone or in combination, Java, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of known computer-readable media.

A computer-readable medium includes any medium that participates in providing data (e.g., instructions), which may be read by a computer. Such a medium may take many forms, including, but not limited to, non-volatile media, volatile media, and transmission media. Non-volatile media include, for example, optical or magnetic disks and other persistent memory. Volatile media include dynamic random access memory (DRAM), which typically constitutes a main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example: a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

Figure 2:
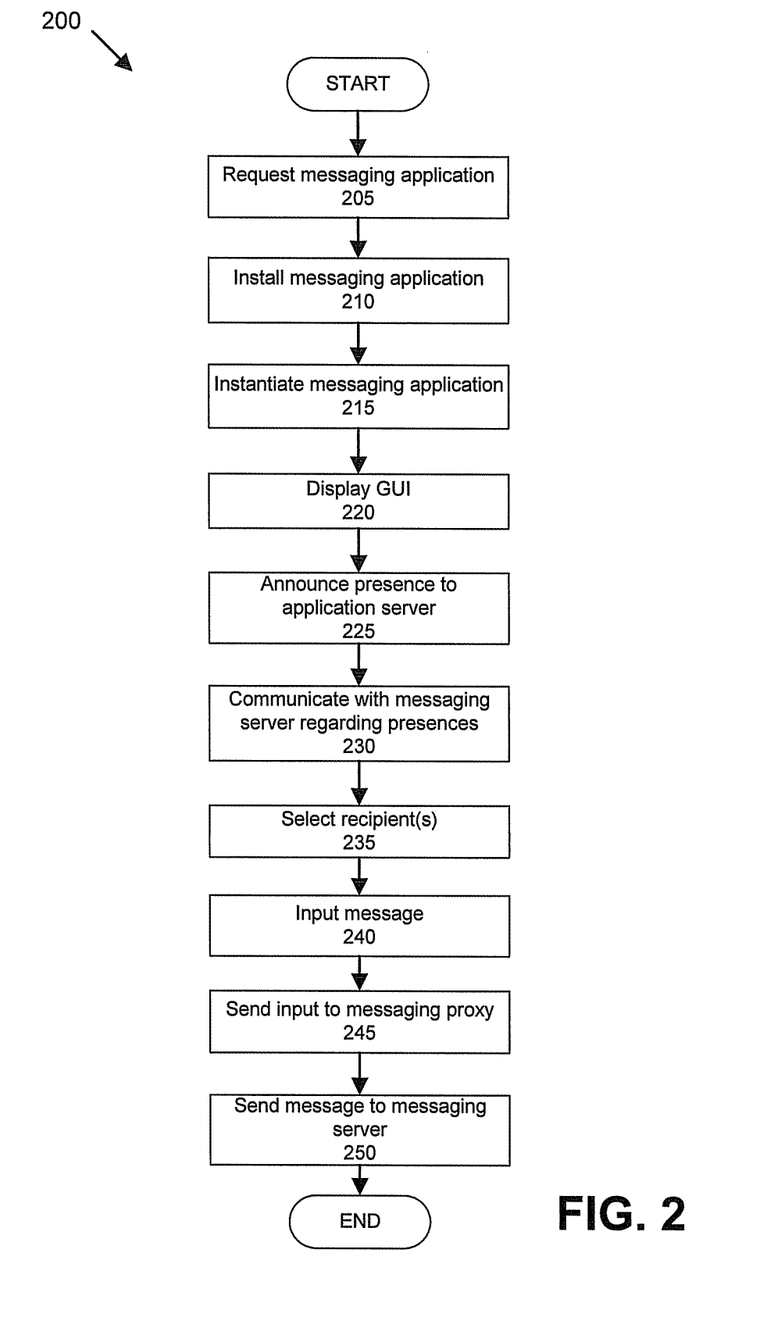
FIG. 2 illustrates a process for accessing a messaging application and sending a message.

FIG. 2 illustrates a process 200 for accessing messaging application 111 and sending a message 105.

In step 205, user 102 seeks to access messaging application 111. For example, user 102 could access messaging application 111 by selecting a menu option provided in a menu displayed by media player 115, or user 102 could access messaging application 111 by using control 112 to specify a channel of media content 150, where the channel was associated with messaging application 111. In the case where a menu is provided, content processing device 110 generally initiates communications with application 130 when content processing device 110 is first powered on. At this time, various program instructions, including menus and the like, may be provided to content processing device 110. Such menus may be displayed one user 102 requests content processing device 110 to display a channel media content 150. Such menus may include an option to access messaging application 111.

Next, in step 210, content processing device 110 communicates with application server 130 to request messaging application 111, whereupon messaging application 111 is installed on content processing device 110. It will be understood that this step is unnecessary when messaging application 111 is persistently stored by content processing device 110. However, as mentioned above, content processing device 110 often has limited resources, in particular, limited memory and storage. Accordingly, to accommodate limitations and content processing device 110, messaging application 111, or even particular components of messaging application 111 necessary to satisfy a request by user 102, may be temporarily downloaded to content processing device 110 from application server 130.

Next, in step 215, content processing device 110 instantiates messaging application 111. Accordingly, messaging application 111 begins to execute within content processing device 110.

Next, in step 220, having been instantiated in step 215, messaging application 111 causes a user interface, e.g., a graphical user interface (GUI) to be displayed by media player 115. The GUI displayed in step 220 may include conventional elements for a messaging client, such as an area to provide textual input for a message 105, a menu option to display an address book of potential recipients of a message 105, a "send" button or the like, etc.

In step 225, messaging application 111 communicates with application server 130 to announce its presence to messaging proxy application 131, Generally, messaging application 111 provides an identifier associated with user 102 to messaging proxy application 131. In some cases, this identifier may simply be an identifier stored in and associated with content processing device 110. However, a user 102 may be provided to input a username and/or password, e.g., when accessing messaging application 111 as described above with respect to step 205. In this scenario, a user 102 may be validated by messaging proxy application 131, and, although not illustrated in FIG. 2, process 200 may terminate if validation is not successful. Although step 225 is shown in FIG. 2 as occurring after step 220, is to be understood that step 225 may be executed prior to or simultaneously with step 220.

Following step 225, in step 230, application server 130 communicates with messaging server 135 to announce its presence, i.e., the presence of messaging proxy application 131 representing messaging application 111. Further, messaging proxy application 131 may obtain a list of potential recipients of message 105 whose presence is detected. This list of potential recipients of message 105 may then be communicated to messaging application 111 and provided to user 102, e.g., in the GUI described above with respect to step 220.

Next, in step 235, user 102 identifies a recipient or recipients for a message 105. An address or addresses for such recipient or recipients may be manually entered using control 112, or may be selected from an address book or the like stored in content processing device 110 or provided from application server 130, e.g., downloaded as described above in step 210.

Next, in step 240, user 102 provides input, generally using control 112, to provide content for a message 105. This input generally includes strings of text, a format well-suited to situations in which content processing device 110 has limited processing power and/or memory, or where the amount of bandwidth that is consumed by a message 105 is a concern. However, other kinds of content may be included in a message 105, such as images, sound, or video captured by a recording device connected to media player 115 or content processing device 110.

Step 240 may be complete when a user 102 selects a "send" button, presses a special key on control 112, etc. Further, step 240 may be complete when a user 102 reaches the end of a line of text or has input a predetermined number of text characters, whereupon messaging application 111 may be programmed to send the line of text or predetermined number of text characters to messaging proxy application 131. In any event, following step 240, in step 245, the input provided in step 240 is sent to messaging proxy application 131. It is to be understood that steps 235, 240, and 245 could be executed in an order other than that illustrated in FIG. 2.

Next, in step 250, messaging proxy application 131 creates message 105 based on the input provided from messaging application 111. As mentioned above, in step 240, messaging proxy application 131 receives an identifier or identifiers for a recipient or recipients of message 105 along with input providing content for the message 105. However, it will be understood that message 105 includes other elements besides recipient information and actual message content. For example, message 105 may include an identifier for the sender, e.g., user 102, a date or timestamp, network addresses associated with recipients, etc. As mentioned above, content processing device 110 may have limited resources to provide to messaging application 111. Accordingly, in step 245, messaging proxy application 131 utilizes the less limited resources of application server 130 to perform certain operations associated with the creation and sending of message 105. However, it should be understood that it is possible for messaging application 111 to perform operations attributed herein to messaging proxy application 131, and therefore it is possible for message 105 to be sent to messaging server 135 directly from content processing device 110.

It should be understood that certain of the steps described above could be performed simultaneously or nearly simultaneously. For example, a user 102 could be providing input received by messaging application 111 as described above with respect to step 240, while at the same time messaging proxy application 131 is sending previously received input to messaging server 135, as described above with respect to step 245. Accordingly, it is further to be understood that certain steps, e.g., steps 235, 240, 245, could be repeated, or could be executed in a loop, although such is not illustrated in process 200.

In some embodiments, once messaging application 111 has been instantiated, a user may access media content 150 through content processing device 110, e.g., may view video channels or the like. In such embodiments, messaging application 111 may provide a GUI alongside or over the display of media content 150 for inputting message 105 content, and for allowing user 102 to send such content, along with recipient identifiers as appropriate to messaging proxy application 131. Accordingly, some or all of process 200 may occur at the same time they content processing device 110 is performing other operations, such as displaying media content 150 such as video.

Following step 250, process 200 ends.

Figure 3:
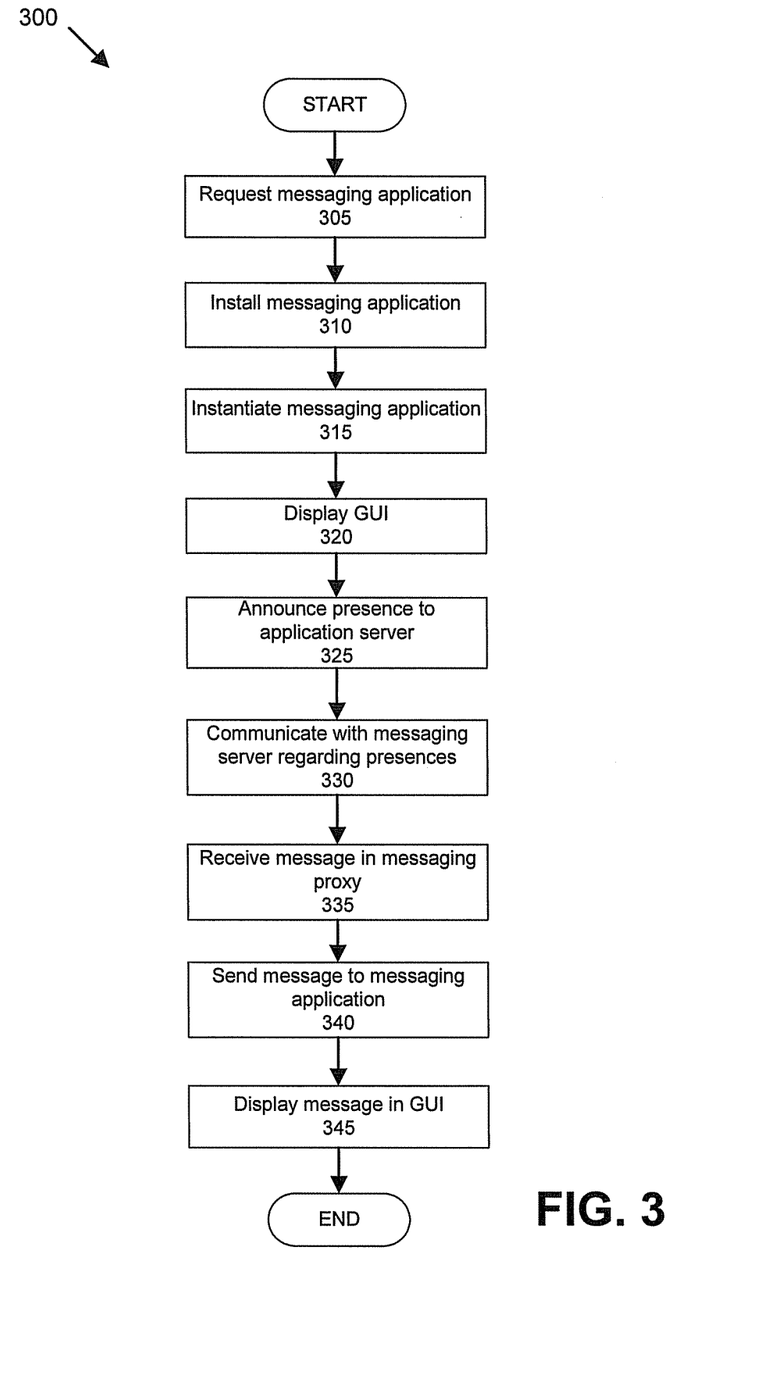
FIG. 3 illustrates a process for accessing a messaging application and receiving a message.

FIG. 3 illustrates a process 300 for accessing messaging application 111 and receiving a message 105.

Steps 305 through 330 of process 300 are generally identical or similar to steps 205 through 230 of process 200.

Step 335 generally follows step 330. In step 335, messaging proxy application 131 receives a message 105 intended for user 102. It should be understood that messaging proxy application 131 may be in communication with multiple messaging applications 111 within different customer premises 101 and different content processing devices 110. Accordingly, upon receiving a message 105, it is generally necessary for messaging proxy application 131 to parse the message 105 as needed to determine the proper recipient for the message 105. Messaging proxy application 131 may also parse a received message 105 to identify the actual message 105 content, e.g., textual content to be provided to messaging application 111 for display to user 102.

Next, in step 340, messaging proxy application 131 sends to messaging application 111 the message 105 received in step 335, or at least portions of the message 105 necessary for display to user 102. For example, message 105 content, e.g., a text string, the identity of a sender of the message 105, at date and/or timestamp, etc. may be provided to messaging application 111 for display to the user 102 in playback device 115.

Next, in step 345, message 105, or portions thereof, are displayed to user 102, e.g. in a GUI displayed in playback device 115. As mentioned above, in some embodiments, once messaging application 111 has been instantiated, a user may access media content 150 through content processing device 110, e.g., may view video channels or the like. In such cases, when a message 105 or portions thereof is received by messaging application 111, as described above with respect to step 340, then messaging application 111 may cause a pop-up window, a textual overlay, or the like including the message 105 or portions thereof to be displayed in media playback device 115 along side or over the display of media content 150. Accordingly, some or all of process 300 may occur at the same time they content processing device 110 is performing other operations, such as displaying media content 150 such as video.

Figure 4:
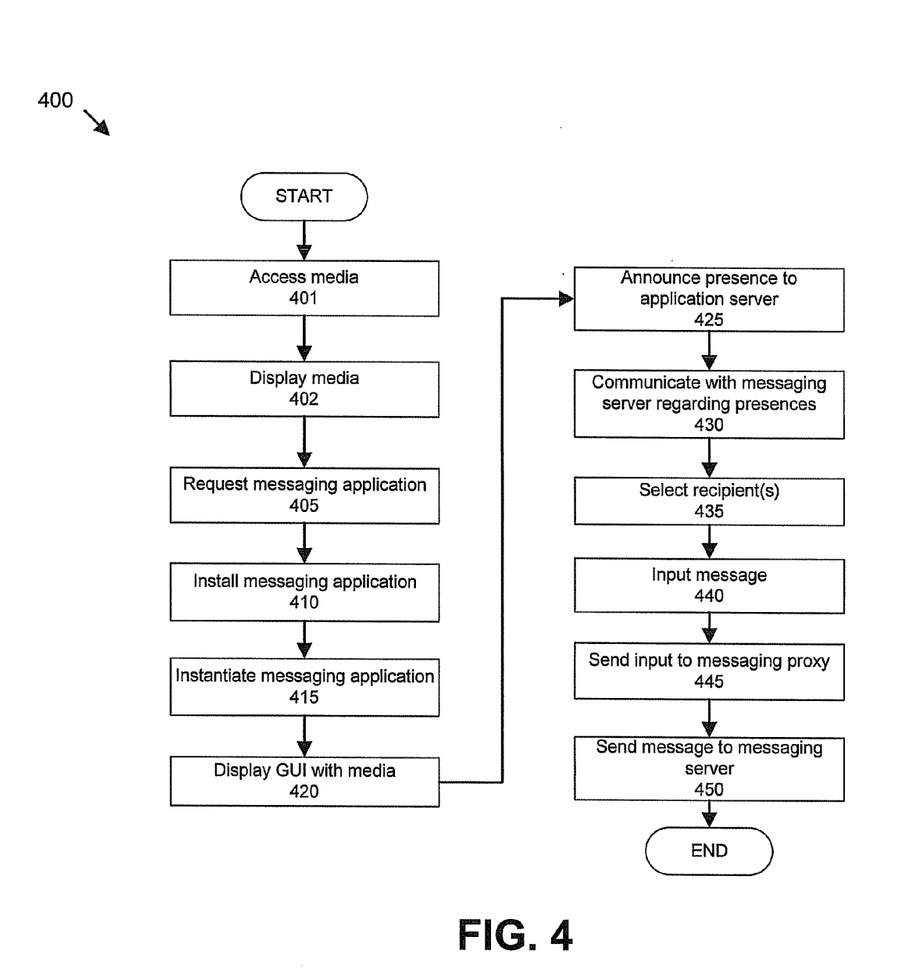
FIG. 4 illustrates a process for accessing a messaging application and sending a message at a same time as media content is accessed and displayed through a playback device.

FIG. 4 illustrates a process 200 for accessing messaging application 111 and sending a message 105 at a same time as media content 150 is accessed and displayed through playback device 115.

In step 401, a user 102 makes a selection, e.g., using control 112, to access media content 150 through playback device 115.

Next, in step 402, media content 150 is displayed, e.g., video is displayed or audio is played, etc. through playback device 115.

Next, in step 405, user 102 seeks to access messaging application 111. This step is similar to step 205 described above with reference to process 200. However, in process 400, user 100 to generally seeks to access messaging application 111 while accessing media, e.g., watching video, through playback device 115. For example, user 102 user 102 could access messaging application 111 by using control 112 select a dedicated key or button associated with messaging application 111.

Next, steps 410 and then 415 are executed much as is described above with respect to steps 210 and 215.

Next, in step 420, having been instantiated in step 415, messaging application 111 causes a user interface, e.g., a graphical user interface (GUI) to be displayed by media player 115. This step is similar to step 220 described above. However, GUI displayed in step 420 may be displayed in media player 115 alongside media content 150, e.g. video, that is being viewed, or may be provided in text displayed over the display of media content 150.

Next, steps 425 through 450 are executed much as is described above with respect to steps 225 through 250.

Next, in step 445, message 105, or portions thereof are displayed to user 102, e.g. in a GUI displayed in playback device 115, generally alongside or overlaid on video content 150 as described above the with respect to step 345.

Following step 450, process 400 ends.

Figure 5:
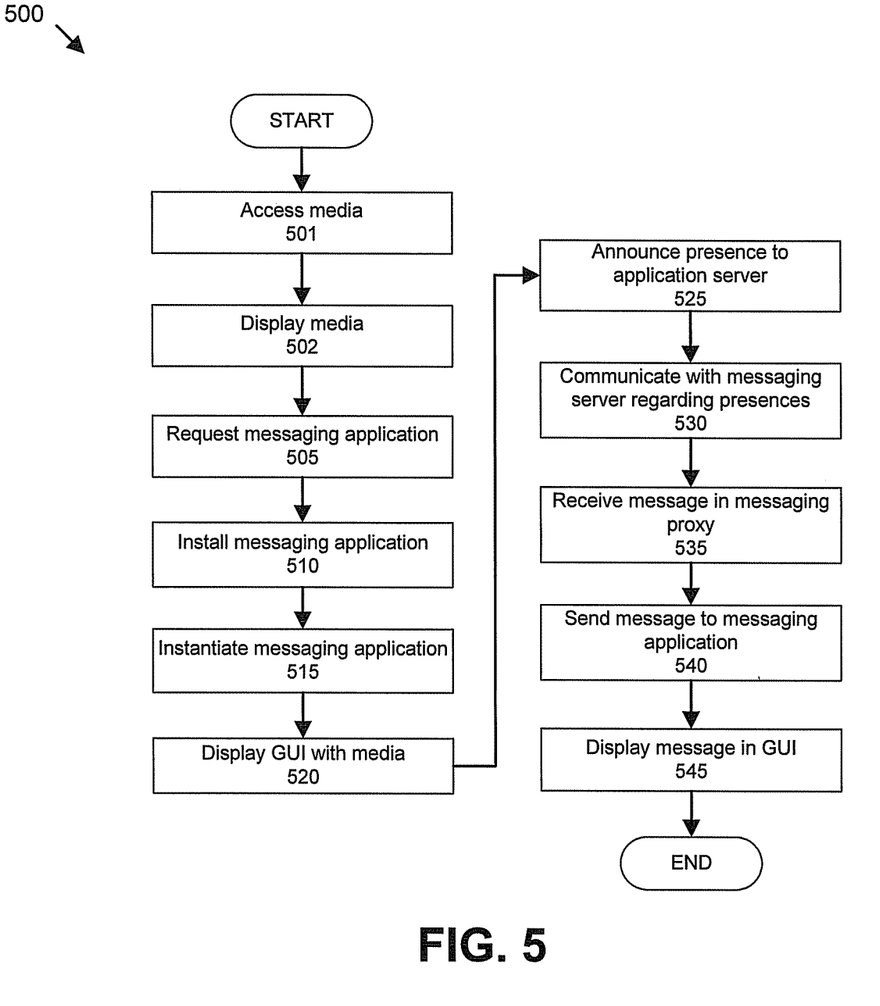
FIG. 5 illustrates a process for accessing a messaging application and receiving a message at a same time as media content is accessed and displayed through a playback device.

FIG. 5 illustrates a process 500 for accessing messaging application 111 and receiving a message 105 at a same time as media content 150 is accessed and displayed through playback device 115.

In step 501, a user 102 makes a selection, e.g., using control 112, to access media content 150 through playback device 115.

Next, in step 502, media content 150 is displayed, e.g., video is displayed or audio is played, etc. through playback device 115.

Next, in step 505, user 102 seeks to access messaging application 111. This step is similar to step 205 described above with reference to process 200. However, in process 500, user 100 to generally seeks to access messaging application 111 while accessing media, e.g., watching video, through playback device 115. For example, user 102 user 102 could access messaging application 111 by using control 112 select a dedicated key or button associated with messaging application 111.

Next, steps 510 and then 515 are executed much as is described above with respect to steps 310 and 315.

Next, in step 520, having been instantiated in step 215, messaging application 111 causes a user interface, e.g., a graphical user interface (GUI) to be displayed by media player 115. This step is similar to step 220 described above. However, GUI displayed in step 520 may be displayed in media player 115 alongside media content 150, e.g. video, that is being viewed, or may be provided in text displayed over the display of media content 150.

Next, steps 525 through 540 are executed much as is described above with respect to steps 325 through 340.

Next, in step 545, message 105, or portions thereof, are displayed to user 102, e.g. in a GUI displayed in playback device 115, generally alongside or overlaid on video content 150 as described above the with respect to step 345.

Following step 545, process 500 ends.

CONCLUSION

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A system, comprising:
   a content processing device that selectively receives media content for display on a media playback device; and
   a software application configured to be executed by the content processing device to communicate with a messaging proxy over a network, wherein a limited resource of the content processing device, including at least one of a limited memory resource and a limited persistent storage resource, makes installing a complete messaging client application including the functionality of both the software application and the messaging proxy at the content processing device impossible, the software application configured to:

announce the presence of the software application to the messaging proxy, the messaging proxy being configured to announce the presence of the messaging proxy representing the software application to a messaging server, provide an identifier stored in and uniquely identifying the content processing device to the messaging proxy to be validated by the messaging proxy, the messaging proxy being configured to validate the identifier to determine whether the content processing device has permission to use the services of the messaging proxy, receive, from the messaging proxy, a list of potential message recipients whose presence is detected by the messaging server, and perform at least one of (a) receiving message content from a remote computer by way of the messaging proxy and providing the message content for display on the media playback device, and (b) receiving input for a message from the content processing device and sending the input to the remote computer by way of the messaging proxy.

2. The system of claim 1, wherein the content processing device is a set top box.

3. The system of claim 1, wherein the remote computer is a messaging server that receives the message content from a client computer.

4. The system of claim 1, wherein the remote computer is a client computer.

5. The system of claim 1, wherein the message includes a text message.

6. The system of claim 1, wherein the message content and the media content are provided for display on the media playback device at a same time.

7. The system of claim 1, wherein the remote computer is an application server that includes a messaging proxy application configured to perform at least one of (a) sending a message to the content processing device and (b) receiving the input sent from the content processing device and sending a message based on the input.

8. The system of claim 1, further comprising:
a packet switched network that provides a communications link between the remote computer and the content processing device; and
a media distribution network that provides the media content to the content processing device.

9. The system of claim 1, wherein the content processing device is further configured to download the software application upon receipt of a download request.

10. A method comprising:
receiving media content;
selectively providing the media content to a content processing device for display on a media playback device;
receiving, by a messaging proxy application from a messaging application executed by the content processing device, an announcement of presence of the messaging application from the messaging application, wherein a limited resource of the content processing device, including at least one of a limited memory resource and a limited persistent storage resource, makes installing a complete messaging client application including the functionality of both the messaging application and the messaging proxy application at the content processing device impossible;

receiving, by the messaging proxy application from the messaging application, an identifier stored in and uniquely identifying the content processing device to be validated by the messaging proxy application;

validating, by the messaging proxy application, the identifier to determine whether the content processing device has permission to use the services of the messaging proxy application;

announcing, by the messaging proxy application to a messaging server, the presence of the messaging proxy application representing the messaging application;

obtaining, by the messaging proxy application, a list of potential recipients of a message whose presence is detected by the messaging server;

communicating, to the messaging application by the messaging proxy application, the list of potential recipients of a message;

receiving, by the messaging proxy application from the messaging application, a request for creation of a message in a messaging format including user input to include in the message;

creating, by the messaging proxy application for the content processing device, a message in the messaging format based on the provided input, allowing for creation of the message in the messaging format despite the limited resources of the content processing device; and sending the message including the input to a remote computer in the messaging format.

11. The method of claim 10, further comprising receiving a message including the message content in the remote computer from a client computer, wherein the remote computer is a messaging server.

12. The method of claim 10, wherein the remote computer is a client computer.

13. The method of claim 10, wherein the message includes a text message.

14. The method of claim 10, wherein the message content and the media content are provided for display on the media playback device at a same time.

15. The method of claim 10, further comprising using an application server that includes the messaging proxy application to perform at least one of (a) sending a message to the content processing device and (b) receiving the input sent from the content processing device and sending a message based on the input.

16. The method of claim 10, further comprising:
performing one of (a) retrieving message content from the remote computer via a packet switched network and (b) sending the input to the remote computer via the packet switched network; and
receiving the media content via a media distribution network.

17. The method of claim 10 embodied as a set of instructions on a tangible computer-readable storage medium.

18. The system of claim 7, wherein the remote computer is the application server, and wherein the software application is downloaded using the application server.

19. The method of claim 10, further comprising:
displaying, on the media playback device by the content processing device, the list of potential recipients of a message; and receiving, by the content processing device, a selection of a recipient of the message from the list of potential recipients of a message.

20. The method of claim 10, further comprising:
accessing the messaging application by receiving a selection of a dedicated key associated with the messaging application, the key being from one of a plurality of keys included on a control configured to operate the content processing device; and
sending, from the content processing device in response to receiving the selection of the dedicated key, the request to install the messaging application.

21. The method of claim 10, further comprising terminating the accessing of the messaging application by the messaging proxy application when the validation of the identifier by the messaging proxy application is unsuccessful.

22. A system, comprising:
a content processing device having limited resources that selectively receives media content for display on a media playback device;
a messaging application implemented as a software application included on the content processing device and a messaging proxy application remote from the content processing device, wherein a limited resource of the content processing device, including at least one of a limited memory resource and a limited persistent storage resource, makes installing a complete messaging client application including the functionality of both the software application and the messaging application at the content processing device impossible;
an application server that includes the messaging proxy application configured to:
  (a) receive message content in a messaging format and send a message based on the received message content to the content processing device in a format other than the messaging format,
  (b) receive input sent from the content processing device in a format capable of being generated by the limited resources of the content processing device other than the messaging format, create a message in the messaging format based on the provided input to allow for message creation in the messaging format despite the limited resources of the content processing device, and send the message in the messaging format based on the input,
  (c) receive an announcement of presence from the software application,
  (d) receive, from the software application, an identifier stored in and uniquely identifying the content processing device to be validated by the messaging proxy application,
  (e) validate the identifier to determine whether the content processing device has permission to use the services of the messaging proxy application,
  (f) announce the presence of messaging proxy application representing the software application to a messaging server,
  (g) obtain a list of potential recipients of a message whose presence is detected by the messaging server,
  (h) communicate the list of potential recipients of a message to the software application; and wherein the software application is configured to:
  (a) receive message content from the application server and provide the message content for display on the media playback device,
  (b) provide an identifier stored in and uniquely identifying the content processing device to the messaging proxy application to be validated by the messaging proxy application,
  (c) announce the presence of the software application to the messaging proxy application,
  (d) obtain from the messaging proxy application the list of potential recipients to be displayed to the user, and
  (e) receive, from the content processing device, input for a message and send the input to the application server accompanied by a limited header indicating a recipient for the message from the received list of potential recipients.

23. The system of claim 22, wherein the message content and the media content are provided for display on the media playback device at a same time.

24. The system of claim 22, wherein the application server is in selective communication with a messaging server that performs at least one of (a) sending a message including the message content to the application server and (b) receiving a message including the input to the application server.

25. The system of claim 22, further comprising:
a packet switched network that provides a communications link between the application server and the content processing device; and
a media distribution network that provides the media content to the content processing device.

26. The system of claim 22, wherein the software application is further configured to send the input accompanied by header information indicating a recipient for a message to the messaging proxy application.

27. The system of claim 22, wherein the software application is configured to communicate message content according to at least one of a proprietary format and an extensible markup language schema, and wherein the messaging proxy application is further configured to communicate message content according to at least one of Session Initiation Protocol for Instant Messaging and Presence Leveraging Extensions (SIMPLE), Extensible Messaging and Presence Protocol (XMPP), and Short Message Service (SMS) messaging protocols.

28. The system of claim 22, wherein the software application is further configured to provide an identifier associated with a user to the messaging proxy application, and the messaging proxy application is further configured to:
receive a message intended for the user;
parse the message to determine the proper recipient for the message and the message content; and
send the message in a format other than the messaging format to the software application that provided the identifier associated with the user.

29. The system of claim 22, wherein the application server that includes a messaging proxy application is further configured to terminate access of the software application from the messaging proxy application when the validation of the identifier by the messaging proxy application is unsuccessful.

* * * * *